Figure 3:
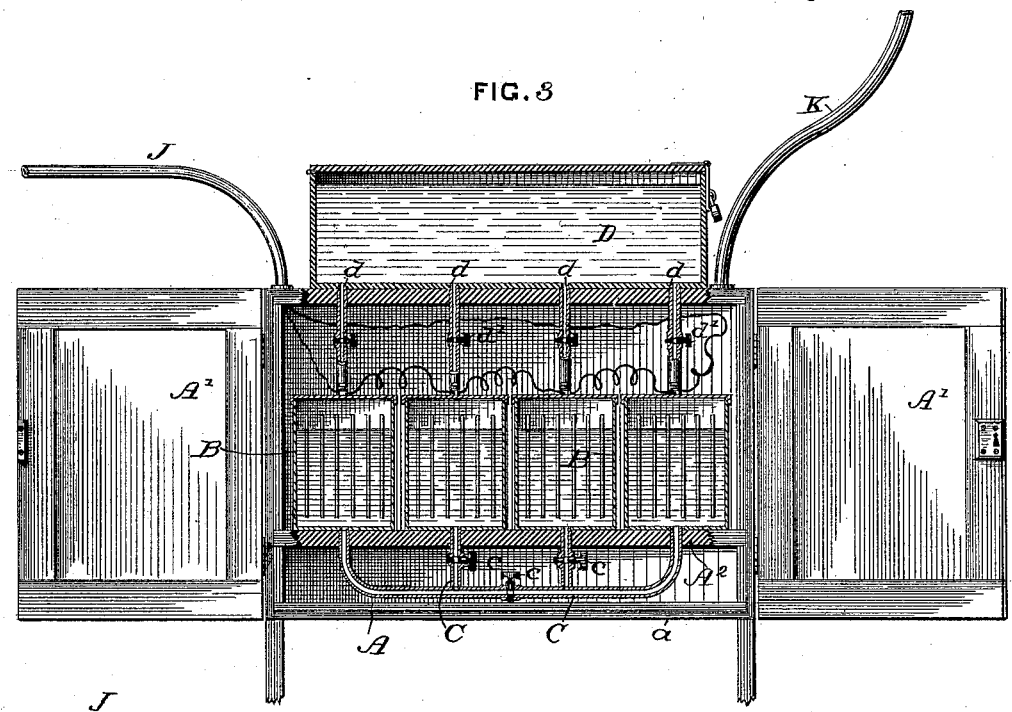

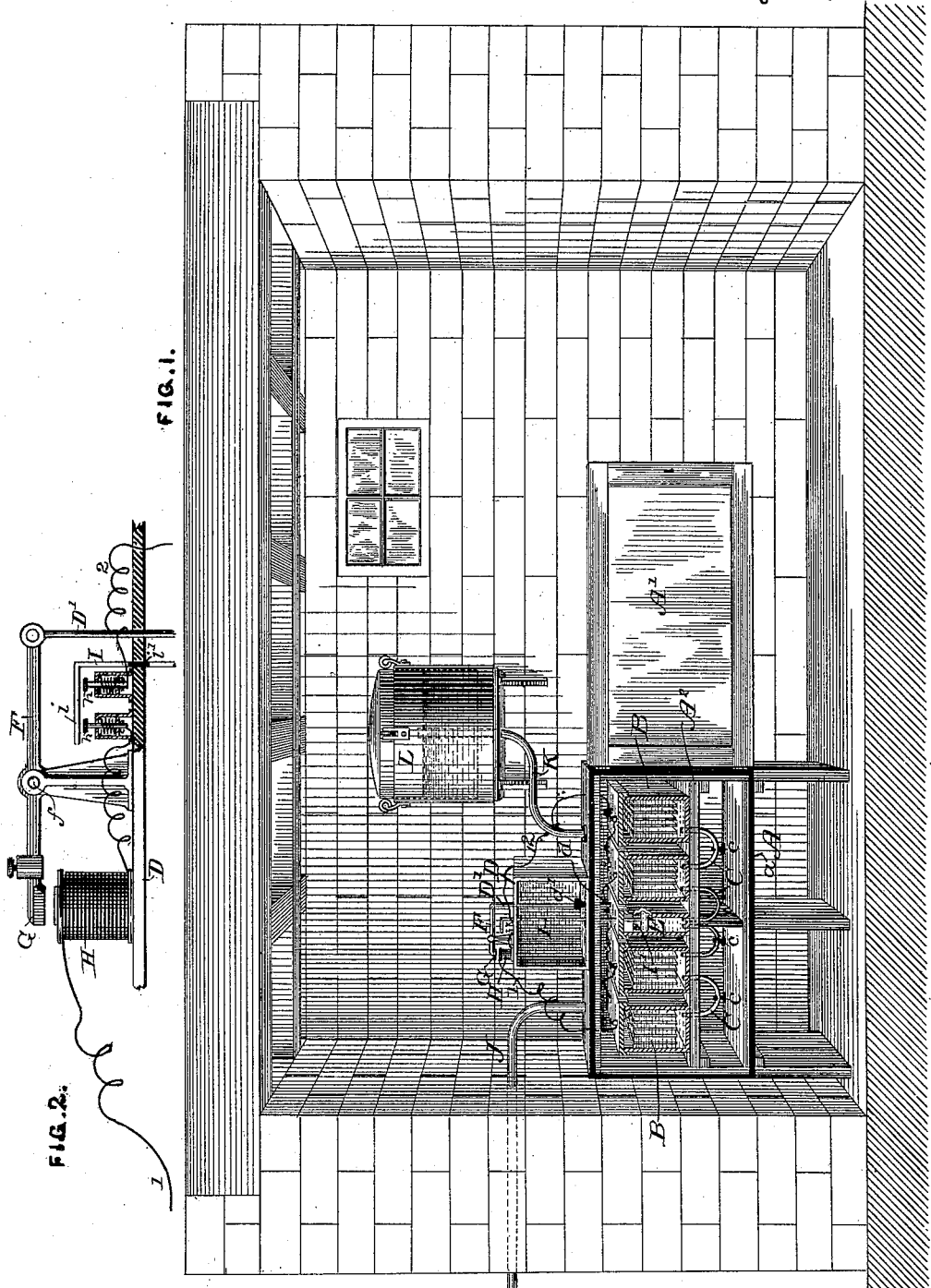

(No Model.) 2 Sheets—Sheet 2.

E. T. STARR.
SECONDARY ELECTRIC BATTERY.

No. 299,434. Patented May 27, 1884.

WITNESSES.
Eugene V. Brown,
James Young.

INVENTOR:
Eli T. Starr,
by his Atty
Wm. J. Payton.

UNITED STATES PATENT OFFICE.

ELI T. STARR, OF PHILADELPHIA, PENNSYLVANIA, ASSIGNOR, BY DIRECT AND MESNE ASSIGNMENTS, TO THE STARR ELECTRIC STORAGE COMPANY, OF NEW JERSEY.

SECONDARY ELECTRIC BATTERY.

SPECIFICATION forming part of Letters Patent No. 299,434, dated May 27, 1884.

Application filed September 8, 1883. (No model.)

*To all whom it may concern:*

Be it known that I, ELI T. STARR, of the city and county of Philadelphia, in the State of Pennsylvania, have invented a certain new and useful Improvement in Charging Secondary Electric Batteries and Maintaining a Supply of the Electrolytic Liquid in such Batteries, of which the following is a specification.

My invention relates to the use of secondary or storage batteries.

It is well known that secondary batteries require to be frequently fed with their electrolytic liquid, and this is mainly due to two causes: first, to the electrolysis of the liquid during the charging of the cells, and, further, to the natural evaporation of the fluid. In an electric lighting or power-distributing system, for example, involving the use of secondary batteries located at different points and charged from a central station, it will be very inconvenient and expensive to be constantly feeding the batteries, as their fluid is consumed, with the usual electrolytic fluid—to wit, diluted sulphuric acid—by means of carriers, sulphuric acid being a bad thing to handle and transport. A further objection to be overcome in the use of secondary batteries is the giving off of gases into the atmosphere, due to electrolysis and evaporation, and the consequent vitiation or poisoning of the atmosphere in dwelling-houses—for instance, in the cellars or other portions of which the batteries may be located. To avoid the necessity, in a very great degree, of carriers for feeding the batteries with fluid, and, further, to prevent the escape into the house of the obnoxious gases or vapors due to charging and ordinary evaporation of the battery-fluid, I have mainly devised my present improvements.

The objects of my present invention may be stated to be more especially, first, to collect the gases given off in charging the batteries, due to the electrolysis of the battery-fluid, for future use, or for the conveyance of such gases to the atmosphere outside the inclosure (the house, for example) in which the battery may be situated; secondly, to feed the battery with electrolytic liquid as the fluid of the battery becomes exhausted by the escape of gases in charging or by evaporation; thirdly, to equalize the fluid in the several cells which may constitute the battery; and, fourthly, to accomplish the feeding or supply of the battery-fluid automatically.

The subject-matter herein claimed is first fully described in detail as organized in the best ways now known to me, and is then recited at the close of the specification.

Figure 4:
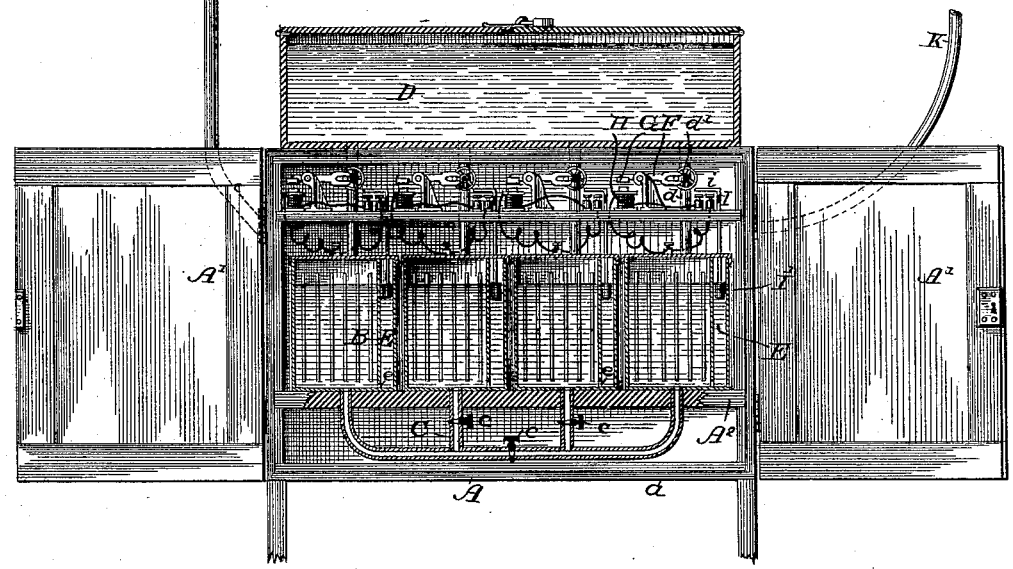

In the accompanying drawings, which illustrate my improvements as embodied in the best ways known now to me, as above stated, Figure 1 is a view in perspective of an organization of my improvements, the several cells making up the battery being shown as inclosed in a case or box located in a cellar of a dwelling-house, for instance, and a gasometer or gas-collector being also shown to receive the gas given off during the charging operation or by evaporation. Fig. 2 is an enlarged view of a portion of the apparatus by which the battery-fluid is automatically supplied to the several cells. Fig. 3 is a view of the battery-inclosing case and a modified arrangement of the battery-cells and the feeding apparatus, and Fig. 4 is a similar view with each cell of the battery provided with an automatic feeding device.

A box or case, A, is fitted to receive the several cells making up a secondary battery of sufficient power, for instance, to run the electric lamps of a dwelling-house or other place in which the battery may be located. The battery-case A in the present instance is represented in Fig. 1 as located in the cellar of a dwelling-house. Said case is provided with a hinged door, A', provided with a lock, whereby the case may be securely closed and locked as against unauthorized access thereto. The case is preferably provided with a suitable packing, as represented at $a$, Fig. 1, for instance, whereby on the closing of the door the case will be rendered tight against the escape of gases into the atmosphere of the cellar or room in which the battery may be placed. The battery-vessels B may be of glass, for example, so as to enable the condition of the battery-fluid to be clearly seen when the door of the case A is opened; but of course the battery-vessels may be made of any suitable material. The several cells B of the battery are preferably mounted on a platform or shelf, A², above the bottom of the case A, so as to provide a space beneath the cells whereby said cells may be conveniently connected by a pipe connection or connections, C, of rubber tubing, for instance, so that the cells communicate with each other, and by which the fluid of the several cells may be equalized in height. Said pipe connection or connections is or are provided with suitable stop-cocks or valves, c, to open or close the communication between the different cells, and these stop-cocks or valves are preferably so organized (being constructed, for example, of rubber) that when the communication between the cells is cut off not only the fluid communication is cut off, but a substantially perfect insulation is also interposed, so that the cells are electrically disconnected or insulated as far as the pipe-connection is concerned. The prime utility of the insulating cut-off or stop-cock is that in charging the battery it prevents the passage of the whole or part of the current through the pipe-connection instead of through the battery-cells. It will be observed, in charging the series of cells, that if there were no insulating cut-off in the pipe-connection connecting said cells a part of the charging-current would pass through the dilute acid of the pipe, instead of the whole of the current being utilized in producing chemical action in the cells.

I may say here that I am aware that several cells of an ordinary galvanic battery have been connected by a pipe-connection for equalizing the fluid therein; but there is no cut-off in the connection, and no necessity for an insulating cut-off or stop-cock.

The main object of the pipe connection or connections C, above mentioned, is to enable, when the stop-cocks or valves are adjusted to permit it, the battery-fluid to be equalized in the several cells, and to flow from one to the other, as the case may require.

Mounted preferably upon and fixed to the top of the case A is a tank or reservoir, D, supplied with diluted acid or other suitable battery-fluid, the tank being of sufficient size, preferably, to constitute a source of supply for feeding the battery for quite a long period with its required fluid. This tank or reservoir may be a lead or other tank capable of withstanding the corrosive action of the acid, and of any suitable construction, preferably having a hinged cover, to be locked against unauthorized access. Said tank D is connected by a pipe, d, for instance, with a vessel, E, in the example shown in Fig. 1, and this vessel in turn is connected by the pipe-connection C, above described, with the several cells of the battery. The upper end of the pipe d terminates at the bottom of the tank D, and is normally closed by a plug or valve, d', whereby communication between the reservoir or tank D and the vessel E, from which the fluid is distributed to the battery-cells, is closed.

When the cells are to be supplied with fluid from the reservoir D, the valve d' is lifted and the free escape of the diluted acid from the reservoir to the vessel E and to the battery-cells is permitted, the cocks or valves c in the pipe-connection C being properly adjusted. I prefer to operate this valve or stopper d' automatically as the feeding of the fluid is required; and to this end it is connected to the lower end of a valve-stem, D', jointed at its upper end to one end of a rocking beam, F, pivoted at f, and carrying an armature, G, at its opposite end. Said armature G is opposed to an electro-magnet, H, included, for instance, in a local or short circuit, 1 2, of the battery, which circuit is only completed when contact is made with terminal-points h h by the upper conducting end, i, of an endwise-movable rod, I. Said rod I is fitted to move endwise through the top of the case A and through the reservoir in this example, and is provided at its lower end with a float, I', movable up and down in the vessel E. When the liquid in the vessel E descends, or is consumed by the repeated charging of the batteries or by evaporation of the battery-fluid, or both, the float I' descends and causes the upper end, i, of the rod I (which end is insulated from the main portion of said rod, as at i') to complete the local circuit 1 2, including the magnet H, and consequently opens or raises the valve d' by the action of said magnet on the armature end of the rocking beam F, as will be obvious. As soon as the vessel E and cells connected therewith are filled or replenished sufficiently to cause the float to rise and break the circuit including the magnet H, the valve d' is immediately released by the demagnetization of said magnet, and is brought down to close the pipe d and cut off all communication between the reservoir tank and the vessel E and battery-cells.

I prefer the contact points or pins h h to be yielding or spring pins, so as to insure a good contact, and they are of course insulated from one another.

In the example shown in Fig. 1 the vessel E is located at the center, with the battery-cells distributed on opposite sides thereof, and all connected by the pipe-connections C, already described. In this example, also, the vessel E has an open pipe-connection with only one of the battery-cells, whereby during the feeding of the liquid from the reservoir D to the vessel E not only the vessel E but said battery-cell will also be supplied or filled. In the example shown in Fig. 1, in order to replenish the other cells of the battery, the stop-cocks or valves c, above described, in the pipe-connections C, are manipulated so as to permit the fluid to flow to the several cells to fill them.

The charging-wires are preferably led to the battery through a protecting conduit or pipe, J, and connected with the battery in any suitable manner, whereby the charging-wires are protected from manipulation or access and from all danger of contact with persons who may enter the cellar or other place where the battery is located. The cells may of course be connected up in multiple arc or for intensity, as desired, either in charging or while being discharged; but neither the manner of connecting up the battery nor the particular construction of its electrodes constitutes a part of this invention, as the changes that may be made in these particulars are many, and some of them obvious to and well understood by those skilled in the construction and use of secondary batteries.

In Fig. 1 I have shown the case A as connected by a pipe, K, with a vessel, preferably a gasometer, L, whereby the gases given off during the charging of the battery or by evaporation may be collected and preserved for future use. Where it may not be desirable to preserve the gases or products of decomposition, the pipe K may lead to the atmosphere outside of the house or other place where the batteries are located, so as to avoid discomfort or injury to the occupants of the premises.

In Fig. 3 I have shown a modified arrangement of some of my improvements. In this example the vessel E is dispensed with or omitted and a direct feed-pipe connection, $d$, made between each cell of the battery and the tank or reservoir D, each pipe-connection $d$ being provided with a suitable stop-cock or valve, $d'$, which may be manipulated by hand in feeding the battery. In this example the charging-wires are shown. The pipe connection or connections C and the gas-escape pipe K are also present in this embodiment. By this organization it will be seen that each cell may be fed independently of the rest or the fluid in all may be equalized.

In Fig. 4 I have shown an arrangement whereby the battery is automatically fed or supplied with its necessary fluid as the fluid becomes exhausted or consumed. The several cells in this example are each provided with a vessel, E, in which a float arrangement controlling a valve is provided, substantially similar to that described in connection with Fig. 1, the battery cell and vessel communicating with each other at the bottom—for example, as shown at $e$. The several cells are connected by the pipe connection or connections C, as before. The float in each vessel E controls its respective stop-cock or valve $d'$ in a direct feed-pipe connection $d$ with the tank or reservoir D, the connection between the rocking beam F and said cock or valve $d'$ being made by a slot and pin and crank or wheel, for example, so that the crank or wheel on being turned by the rocking of the beam F will open or close the feed-pipe connection in a well-known way. As the beam F is rocked by the attraction of the magnet H upon the armature G, the feed-pipe is opened to feed fluid to the battery-cell, while when the circuit in which the magnet is included is broken the movement of the wheel is reversed by a spring, for example, and the feed-pipe closed.

It will be obvious that a single magnet and armature-beam might be employed to simultaneously work all the cocks or valves of the several feed-pipes shown in Fig. 4 by means of suitable connections, obvious in several ways to skillful mechanicians, and, further, that but one feed-pipe may be employed, (with branches between the tank and battery-cells,) having a stop-cock or valve worked automatically by the electro-magnetic arrangement already described, or by some equivalent organization; but this is so obvious and may be accomplished in so many different ways that I have deemed it unnecessary to further elaborate the modifications in the drawings or extend this specification to an unnecessary length by reciting such arrangements in detail.

Having thus fully indicated the nature and objects of my invention and the best ways, in my judgment, for carrying the same into effect, I would have it understood that I claim herein—

1. The combination of two or more battery-cells with a pipe-connection between them, provided with an insulating cut-off, substantially as described.

2. The combination, with a battery, of a reservoir-tank, a feed-pipe connection between said battery and said tank, a valve or cock controlling the communication between said reservoir and said battery, an independent pipe-connection between the cells of said battery, and a cut-off in said independent pipe-connection, substantially as described.

3. The combination, with a battery, of a reservoir-tank, a feed-connection between said tank and said battery, a valve or cock controlling the communication between said tank and said battery, an electro-magnetic device controlling the operation of said valve or cock, a contact device to make and break the circuit, including said electro-magnetic device, and a device controlled by the liquid of the battery to operate said contact device, substantially as described.

In testimony whereof I have hereunto subscribed my name this 6th day of September, A. D. 1883.

ELI T. STARR.

Witnesses:
WM. J. PEYTON,
FRANK A. MULLIKIN.